US008172567B2

(12) United States Patent  (10) Patent No.: US 8,172,567 B2
Lodin  (45) Date of Patent: May 8, 2012

(54) LANCING OF OXYGEN

(75) Inventor: Johannes Lodin, Älvsjö (SE)

(73) Assignee: AGA AB, Lidingö (SE)

( * ) Notice: Subject to any disclaimer, the term of this patent is extended or adjusted under 35 U.S.C. 154(b) by 808 days.

(21) Appl. No.: 11/508,730

(22) Filed: Aug. 23, 2006

(65) Prior Publication Data

US 2007/0287109 A1  Dec. 13, 2007

(30) Foreign Application Priority Data

Jun. 9, 2006 (SE) ...................................... 0601274

(51) Int. Cl.
*F23D 14/32* (2006.01)
(52) U.S. Cl. ........................... 431/10; 431/165; 431/351
(58) Field of Classification Search .................... 431/10, 431/165, 351
See application file for complete search history.

(56) References Cited

U.S. PATENT DOCUMENTS

| | | | | | |
|---|---|---|---|---|---|
| 1,513,828 | A | * | 11/1924 | Kernohan et al. ............... | 432/22 |
| 2,140,088 | A | * | 12/1938 | MacDonald .................... | 431/185 |
| 2,941,587 | A | * | 6/1960 | Hagy et al. ................. | 239/132.3 |
| 3,202,196 | A | * | 8/1965 | Rackley et al. ................ | 122/6.5 |
| 3,620,514 | A | * | 11/1971 | Geiger, Jr. ........................ | 432/26 |
| 3,797,814 | A | * | 3/1974 | Rymarchyk et al. ........ | 239/132.3 |
| 4,021,186 | A | * | 5/1977 | Tenner ............................ | 431/10 |
| 4,488,869 | A | * | 12/1984 | Voorheis ....................... | 431/352 |
| 4,531,904 | A | * | 7/1985 | Sato et al. ........................ | 431/10 |
| 4,909,733 | A | * | 3/1990 | Yap ................................ | 432/195 |
| 4,927,357 | A | * | 5/1990 | Yap ................................. | 431/10 |
| 5,007,823 | A | * | 4/1991 | Mayotte et al. ................. | 432/14 |
| 5,242,296 | A | * | 9/1993 | Tuson et al. .................... | 431/10 |
| 5,383,782 | A | * | 1/1995 | Yap ................................ | 432/22 |
| 5,413,476 | A | * | 5/1995 | Baukal et al. ................... | 431/10 |
| 5,460,512 | A | * | 10/1995 | Lifshits et al. ................... | 431/9 |
| 5,554,022 | A | * | 9/1996 | Nabors et al. ................... | 431/10 |
| 5,562,437 | A | * | 10/1996 | Gauthier et al. ................ | 431/10 |

(Continued)

FOREIGN PATENT DOCUMENTS

DE  3346982 A1 * 7/1985

(Continued)

OTHER PUBLICATIONS

"Nitric Oxide Measurements in Oxygen Enriched Air-Natural Gas Combustion Systems," by C. E. Baukol, Jr. and A. L. Dalton, *Proceedings of the Fossil Fuel Combustion Symposium 1990*, ASME, PD—vol. 30, pp. 75-79, 1990.

*Primary Examiner* — Carl Price
(74) *Attorney, Agent, or Firm* — Alfred J. Mangels

(57) ABSTRACT

A method for providing uniform heat distribution within a furnace as well as decreasing the amount of $NO_x$ in the combustion products, when operating an industrial furnace having at least one conventional burner using air as the oxidant. At least one lance is connected with the furnace, and an oxidant including oxygen gas is flowed into the furnace through the lance to impinge against a flame issuing from the burner at a certain impingement point. The amount of oxygen supplied by the air supply to the burner together with the amount of oxidant issuing from the lance corresponds with the stoichiometric amount for a fuel supplied to the burner. At least 50% of the supplied oxygen for combustion is supplied through the lancing of oxidant, and the oxidant is flowed into the furnace through the lance at a velocity of at least 200 m/s.

7 Claims, 1 Drawing Sheet

U.S. PATENT DOCUMENTS

| | | | | |
|---|---|---|---|---|
| 5,755,818 A | * | 5/1998 | Tuson et al. | 431/10 |
| 5,924,858 A | * | 7/1999 | Tuson et al. | 431/10 |
| 5,944,507 A | * | 8/1999 | Feldermann | 431/189 |
| 5,975,886 A | * | 11/1999 | Philippe | 431/165 |
| 6,077,072 A | * | 6/2000 | Marin et al. | 432/105 |
| 6,206,949 B1 | * | 3/2001 | Kobayashi et al. | 431/5 |
| 6,422,041 B1 | * | 7/2002 | Simpson et al. | 65/134.4 |
| 6,582,218 B1 | * | 6/2003 | D'Agostini et al. | 431/181 |
| 6,659,762 B2 | * | 12/2003 | Borders et al. | 431/8 |
| 6,685,464 B2 | * | 2/2004 | Marin et al. | 431/10 |
| 6,705,117 B2 | * | 3/2004 | Simpson et al. | 65/134.4 |
| 2003/0054305 A1 | * | 3/2003 | Manohar | 431/10 |

FOREIGN PATENT DOCUMENTS

| | | | | |
|---|---|---|---|---|
| EP | 76036 A1 | * | 4/1983 | |
| GB | 2048456 A | * | 12/1980 | |
| JP | 52026024 A | * | 2/1977 | |
| JP | 53141932 A | * | 12/1978 | |
| JP | 55102823 A | * | 8/1980 | |
| JP | 07010545 A | * | 1/1995 | |
| JP | 11-132420 | * | 5/1999 | |
| JP | 2001012721 A | * | 1/2001 | |

* cited by examiner

LANCING OF OXYGEN

BACKGROUND OF THE INVENTION

1. Field of the Invention

The present invention relates to industrial furnaces, and more particularly to a method of uniformly distributing heat within an industrial furnace and of decreasing the quantity of $NO_x$ in the combustion products.

2. Description of the Related Art

Today industrial furnaces are widely used for melting and for heat treating metals, for example. Many of those furnaces use one or several burners of the conventional type, which are fed by a fuel such as propane, oil, natural gas, or the like, and fed also with an oxidant. In many cases, air is used as the oxidant.

Such furnaces can be of various sizes. It is often desirable to maintain an even temperature distribution within the furnace, which can be difficult to achieve in the case of large furnaces, since the convective heat transfer within the furnace becomes less effective as the volume of the furnace increases. That problem can be solved, by way of example, by rotating the furnace body during operation.

In certain cases, an extra supply of oxidant can be arranged in a furnace, in addition to the oxidant supplied through the burner itself. For example, an extra oxidant supply can be achieved by the use of a supply pipe, arranged at a distance from the burner, through which oxidant can flow into the furnace. Such a supply pipe is referred to herein as a lance, and the procedure for bringing oxidant to flow into a furnace body through such a lance is referred to herein as lancing.

If the thus-lanced oxidant is an oxidant having at least 85 weight % oxygen gas that is lanced in that manner, for example, and if it is directed into the furnace body at an angle that makes the stream of oxidant intersect a point at or near the flame of the burner, various phenomena arise. For instance, it is possible to control the temperature distribution of the flame in a way so that it becomes rotationally asymmetric. Such phenomena can be utilized in order to control the temperature profile of the flame, for example, so that the flame becomes warmer near a blank to be heated, and less warm near a furnace wall.

In order to achieve stoichiometric balance, the amount of oxidant lanced in that way and the amount of oxidant fed from the burner must be balanced against the amount of supplied fuel. That balance is achieved by decreasing the amount of oxidant fed by the burner, whereby a stoichiometric deficit is introduced in the flame immediately outside the nozzle of the burner. However, that stoichiometric deficit is balanced against the lanced oxidant at the place where the lanced stream of oxidant intersects the flame.

A problem regarding industrial furnaces with burners using air as the oxidant is that their efficiency is relatively low, and their heat output is relatively high. That means that the heat output is relatively high in terms of fuel amounts, as compared to the useful yield that in fact is usable for heating the furnace volume. One reason for that is that thermal energy is used for heating the nitrogen content of the oxidant air.

Another problem is that the flame of a burner using air as the oxidant produces relatively large amounts of combustion products in the form of $NO_x$ compounds, as a result of the elevated flame temperatures. That is not desirable, since $NO_x$ compounds negatively affect the environment, and since there often are limitations present for the volumes of $NO_x$ compounds that can be produced in various industrial processes.

As a solution to those problems, so-called oxyfuel burners have been suggested for use in industrial furnaces. In oxyfuel burners, oxygen gas is used as the oxidant. Such burners offer a higher efficiency at a lower heat output, whereby less fuel is needed to achieve the same yield in terms of heating within the furnace. Also, the amount of $NO_x$ compounds produced is decreased.

However, there is a problem in that there is a substantial cost involved to exchange an air-fed burner with an oxyfuel burner in an industrial furnace. Furthermore, it is difficult to maintain high temperature uniformity in the entire furnace volume when such a burner is used in large industrial furnaces, because convection decreases as a consequence of the lesser amounts of flue gases that are produced as a result of the lower operation effects for oxyfuel burners. The result is uneven furnace temperature distribution, with the associated uneven quality of production.

Another suggested solution, on the other hand, is to increase the share of oxygen gas in the supplied air. However, that has proven to result in other problems.

The present invention solves the above problems.

SUMMARY OF THE INVENTION

Briefly stated, the present invention relates to a method for uniformly distributing heat, as well as for decreasing the amount of $NO_x$ in the combustion products, when operating an industrial furnace with at least one conventional burner using air as an oxidant. At least one lance is introduced into the furnace. An oxidant in the form of oxygen gas is introduced into the furnace through the lance and impinges onto the flame of the burner at a certain point. The amount of oxygen supplied, partly through the air supply of the burner and partly through the lancing of oxidant, is brought into stoichiometric correspondence with the amount of fuel supplied through the burner. At least 50% of the supplied oxygen is supplied through the lancing of oxidant, and the oxidant is fed into the furnace through the lance at a velocity of at least 200 m/s.

BRIEF DESCRIPTION OF THE DRAWING

The invention will now be described in detail, with reference to the exemplifying embodiments of the lancing method according to the invention, and with reference to the attached drawing, wherein:

FIG. 2a is a sectional view similar to FIG. 1 of an industrial furnace that has been provided with two oxidant lances in accordance with an embodiment of the method of the present invention, oriented along the centerline I-I of FIG. 2a.

FIG. 2b is a sectional view of an industrial furnace similar to FIG. 2a that has been provided with two oxidant lances in accordance with an embodiment of the method of the present invention, oriented along the centerline II-II of FIG. 2b, rotated 90° relative to FIG. 2a.

DESCRIPTION OF THE PREFERRED EMBODIMENTS

Figure 1:
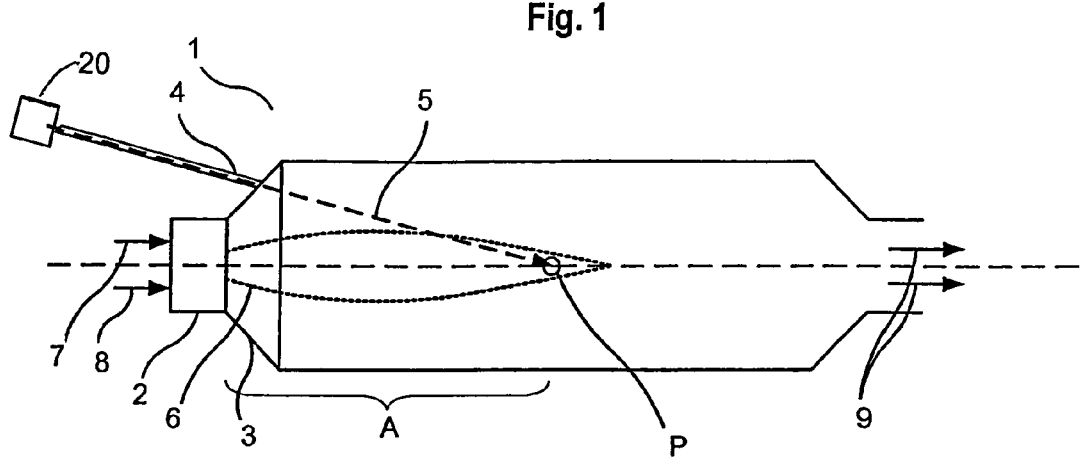
FIG. 1 is a sectional view of an industrial furnace with a burner using air as the oxidant, where the furnace has been provided with an oxidant lance in accordance with an embodiment of the method of the present invention.

In FIG. 1, a rotating industrial furnace is depicted. The furnace 1 is heated by the use of a conventional burner 2, using natural gas 7 as the fuel and air 8 as the oxidant. However, it should be understood that the fuel can be any other suitable fuel, such as various liquid or gaseous hydrocarbons. The burner 2 has an associated flame 6, and is mounted in a furnace door 3, which is arranged at a first end of the furnace 1. Through an opening at the other end of the furnace 1 from burner 2, combustion products 9 exit from the furnace.

The inside diameter of the furnace 1 can, by way of example, be 3.5 m, and it can be about 12 m in length. It can be used for melting out metallic aluminum from so-called dross, which consists of a mixture of aluminum and aluminum oxide. Because of the size of the furnace 1, it must be rotated in order to be able to maintain a sufficiently uniform temperature distribution inside the volume of the furnace. It should be noted, however, that the invention not only is usable in rotary furnaces, but it can also be used in stationary furnaces, and also in furnaces having other areas of application than the processing of dross.

When using the furnace 1 with the conventional burner 2 and without the lancing method according to the present invention, large amounts of $NO_x$ compounds will be produced as a residual product from the combustion of the fuel. Furthermore, and as a consequence of the size of the volume of the furnace, rotation of the furnace 1 will not suffice for creating a sufficiently uniform temperature for all desired applications.

According to the present invention, a lance 4 is mounted through the door 3 of the furnace and opens into the volume of the furnace 1. The lance 4 can have an inside diameter of 40 mm, and is provided, in its end facing into the furnace 1, with two discharge openings (not shown) that are arranged at an angle from each other of about 10°, both openings having an inside diameter of 15 mm. The lance is inserted through a drilled hole (not shown) extending through the door 3 of the furnace 1, and the side of the hole which faces into the furnace 1 is brought to a position essentially level with the outer wall surface of the door 3 of the furnace. Through the lance 4, and into the furnace 1, an oxidant having at least 85 weight % oxygen gas is supplied. The oxidant is supplied to the lance 4 under an overpressure of about 4 bars, which results in an exit velocity from the lance discharge openings of about 300 m/s. Because the discharge openings are arranged at an angle relative to each other, the resulting oxidant stream 5 inside the furnace 1 will have a spread of about 10°. The oxidant stream 5 impinges against the flame 6 at a point P, at a distance A from the burner 2. At the point P, the oxidant stream 5 has thus had the time to spread, so that it is broader in width in comparison to its width at the discharge opening of the lance 4.

That the oxidant stream 5 impinges against the flame 6 means, in the present context, that the nearest distance between the oxidant stream 5 and the central axis of the flame 6 is made so small that at least one part of the oxidant stream 5 and at least one part of the flame 6 come into direct contact with one another at the place where the distance between the stream 5 and the flame 6 is minimal.

Because additional oxidant is introduced into the furnace 1 through the lance 4, in addition to the oxidant already fed into the furnace 1 through the burner 2, it is required that the quantity of oxidant supplied through the burner 2 be reduced in order for the stoichiometric equilibrium to be maintained between the amount of fuel supplied and the total amount of oxidant supplied. Thus, the quantity of oxidant supplied by the burner 2 is reduced so that stoichiometric equilibrium is maintained, depending upon the amount of oxidant supplied through the lance 4. In order to achieve the advantages of the present invention, at least 50% of the total supplied oxygen must be supplied through the lance 4. Preferably, about 60% of the oxygen is supplied to the furnace through the lance 4, and 40% of the oxygen through the burner 2.

In the furnace 1, about 60% of the oxygen can be supplied through the lance 4 in the form of an oxidant having at least 85 weight % oxygen gas, and the rest of the oxygen is supplied as a component of the air being supplied through the burner 2. For example, that means that if about 890 m³/h oxygen gas is supplied through the lance 4, at the same time about 585 m³/h oxidant is supplied through the burner 2. Also in that case, about 700 m³/h of natural gas is supplied through the burner 2, whereby stoichiometric equilibrium is achieved for the combustion reaction as a whole.

It should be noted that one can, of course, apply the present invention to industrial furnaces with more than one conventional burner. In those cases at most 50% of the total supplied oxidant is supplied through the burners, and the rest of the oxidant is supplied through lancing.

The distance A is chosen depending upon the intended application, the length of the flame 6, etc., so that a sufficiently strong turbulence is achieved inside the volume of the furnace 1 in order to obtain the advantages of the invention. Preferably, the distance A is chosen to be between ¼ and ½ of the total inside length of the furnace 1, most preferably about ⅓ of the total inside length of the furnace 1.

As the oxidant stream 5 with an oxygen content of as much as 50% or more of the total supplied oxygen, impinges upon the flame 6 with a high velocity, a strong recirculation of the combustion products is achieved. Actually, the high velocity of the lanced oxidant stream 5 creates a reduced pressure region, sucking combustion products into the flame 6, as a result of which the flame 6 will occupy a larger volume. Consequently, the combustion temperature inside the flame 6 falls to such levels that the production of $NO_x$ compounds drastically decreases during combustion, which is desirable. Furthermore, the inventor has been able to verify the turbulence-creating effect that the lancing of oxygen at elevated velocities provides inside the volume of the furnace, and thereby convection currents, so that the temperature distribution in the furnace is maintained at a relatively uniform level, and so that the operation becomes smooth, even when the method is utilized in very large industrial furnaces.

When put into practice in the furnace 1, the present invention can be applied in three distinct phases:

In the first phase, the cold or preheated material to be heated inside the furnace 1 is charged. In the second phase, the burner 2 is operated at a high heat output, and additional oxidant is also lanced into the furnace 11 under stoichiometric equilibrium. That provides the advantages associated with the present invention in terms of low $NO_x$ production and good temperature uniformity within the furnace. Once the material is completely heated, at which time only maintenance heating is required to avoid cooling down of the heated material, the third phase is initiated. During that third phase the lancing of additional oxidant is terminated, and the share of the oxidant that is supplied through the burner 2 is increased, in order to maintain the stoichiometric equilibrium. Moreover, in the third phase the heat output of the burner 2 is decreased as compared to the heat output during the second phase.

In that way, the lancing according to the present invention, when it is put into practice together with a furnace 1, can be switched on or off during distinct production steps by oxidant flow control means 20, depending upon the demand for high temperature uniformity and low $NO_x$ production, in combination with the demand for a high or a low heat output.

Furthermore, it is relatively inexpensive to mount a lance 4 for the lancing of oxidant into the interior of an industrial furnace 1 having a burner 2 that uses air as the oxidant, in comparison with, for example, installing an oxyfuel burner in such an industrial furnace 1, because the lance can be easily mounted at, for instance, a drilled hole in the door 3 of the furnace 1. Further, a lance can be positioned so that its oxidant discharge opening is flush with an interior surface of the furnace.

Figure 2A:
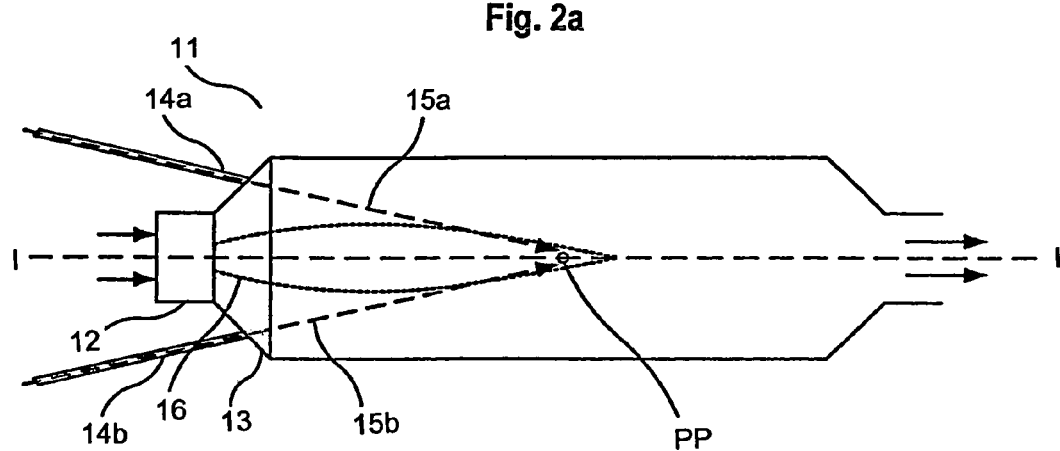
Figure 2B:
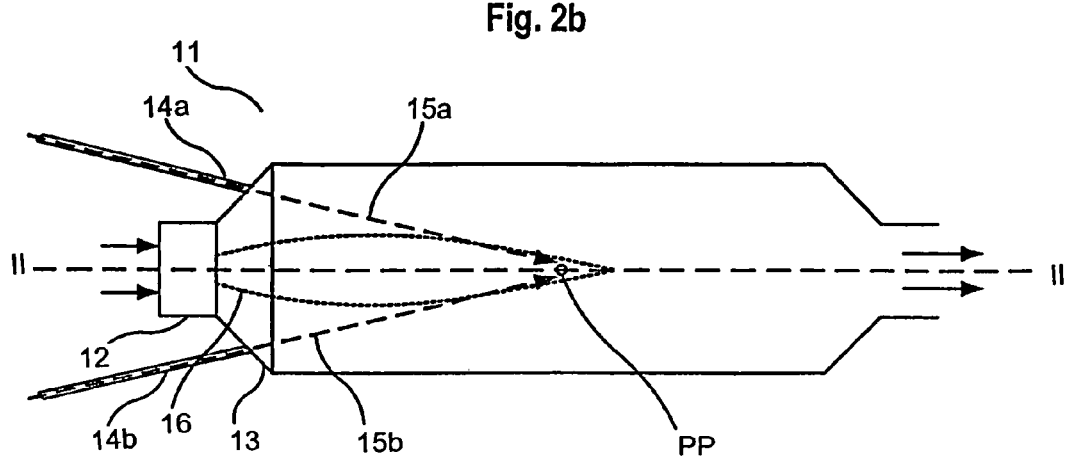

When using only one lance along with a burner, there is a risk of problems arising with respect to asymmetrical heat distributions inside the flame, as described above. Therefore, it is in some cases desirable to use several, cooperating lances along with every burner. FIGS. 2a and 2b show an industrial furnace 11, shown in two different views rotated relative to each other at an angle of 90°, with a conventional burner 12 and two such cooperating lances 14a, 14b, arranged at a door 13 in one of the ends of the furnace 11. In that case, the lances 14a, 14b are directed so that the distance between their respective oxidant streams 15a, 15b is at its minimum at a point at or near a common point of impact PP in the flame 16 of the burner 12, and so that the respective oxidant streams 15, 15b are directed partly towards each other, but do not intersect directly. As is shown in FIGS. 2a and 2b, the lances 14a, 14b are directed toward the flame 16 at two different angles that are inclined with respect to the longitudinal axis of the burner 11. Thus, their respective oxidant streams 15a, 15b pass on a respective side of the flame 16, in the border areas of the flame 16 on each side, where they stream near each other but partly in opposite rotational directions. Thus, they will essentially neutralize any thermal asymmetries of combustion in the flame 16, and at the same time they will further increase the turbulence, and consequently the convection, within the volume of the furnace by giving rise to a spiral-shaped motion inside the furnace volume. Thus, the advantages of the present invention, in terms of low $NO_x$ production in combination with high temperature uniformity, are achieved at the same time because any thermal asymmetries in the flame 6 are avoided.

In the event several lances are utilized in a furnace having several conventional burners, the lanced streams of oxidant could very well strike the different flames at several distinct points of impact. The choice of burner and lance geometries relative to the furnace will thus depend upon the particular furnace application.

Preferred embodiments have been described above. However, it will be apparent to the person skilled in the art that numerous modifications are possible to the described embodiments without departing from the inventive idea. Thus, the invention should not be considered to be limited by the described embodiments, but could rather be modified within the scope of the appended claims.

What is claimed is:

1. A method for uniformly distributing heat within a furnace and for decreasing $NO_x$ in combustion products, said method comprising:
   a. adding a supplemental oxidant to an existing furnace that includes at least one existing burner having a burner outlet and utilizing air as a first oxidant for combustion with a fuel supplied to the at least one burner wherein the supplemental oxidant is introduced into the furnace through at least one lance that is spaced from the at least one existing burner;
   b. introducing supplemental oxidant from the at least one lance into the furnace for selectively providing additional oxidant for combustion of the fuel, wherein the supplemental oxidant issues from an outlet of the at least one lance and forms a supplemental-oxidant stream that has a longitudinal axis that is inclined toward a longitudinal axis of a flame that forms from combustion of the air and fuel that issue from the at least one existing burner;
   c. feeding the supplemental oxidant into the at least one lance, wherein the supplemental oxidant contains at least 85 weight % oxygen gas;
   d. impinging the supplemental oxidant stream upon the flame issuing from the at least one existing burner, wherein impingement of the at least 85 wt % oxygen gas in the supplemental oxidant occurs at an impingement point that is spaced outwardly from an outlet of the existing burner, wherein an oxygen content supplied by air introduced into the furnace through the at least one existing burner for combustion and an oxygen content contained in the supplemental-oxidant stream issuing from the opening of the at least one lance together aggregate a combined quantity of oxidant to provide a stoichiometric content of oxygen for combustion with the quantity of fuel that is introduced through the at least one existing burner; and
   e. supplying through the at least one lance an amount of supplemental oxidant having at least 60% of a stoichiometric content of oxygen for combustion of the quantity of fuel introduced into the burner, wherein the supplemental oxidant is fed into the furnace through the outlet of the at least one lance and issues from the outlet of the lance at a velocity of at least 300 m/s toward the flame issuing from the at least one existing burner.

2. A method according to claim 1, including the steps of: providing at least two lances in association with a single existing burner; and arranging the at least two lances at such respective angles that streams of the supplemental oxidant issuing from the at least two lances are directed so that a distance between the supplemental-oxidant streams is at a minimum at a point adjacent to a common point of impingement of the supplemental oxidant streams issuing from the at least two lances with a flame issuing from the single existing burner, so that the respective supplemental oxidant streams issuing from the at least two lances are partly directed toward each other.

3. A method according to claim 1, including the step of arranging an angular relationship between the supplemental-oxidant stream and the flame that issues from the existing burner, so that the supplemental-oxidant stream impacts the flame that issues from the burner at a point of impact within the furnace at a distance from the outlet of the at least one existing burner of between ¼ and ½ of the total interior length of the furnace.

4. A method according to claim 1, including the steps of: controlling supplemental-oxidant flow from the at least one lance so that the flow is selectively on or off during different processing steps; and regulating an amount of supplied oxygen from an air supply to the at least one existing burner continuously based upon an amount of fuel supplied to the at least one existing burner, so that stoichiometric equilibrium is maintained between the amount of fuel and the amount of oxidant introduced into the furnace as the supplemental oxidant flow from the at least one lance is turned on or off.

5. A method according to claim 1, including the step of discharging the supplemental oxidant from the at least one lance to provide a supplemental oxidant stream having a spread of about 10° relative to a longitudinal axis of the outlet of the at least one lance.

6. A method according to claim 1, wherein the furnace is a rotating industrial furnace.

7. A method according to claim 2, including the step of positioning each lance so that respective supplemental-oxidant discharge openings of the lances are each flush with an interior surface of the furnace.

* * * * *